July 12, 1960
H. NAGEL ET AL
2,944,918
POLYETHYLENE TEREPHTHALATE FILM HAVING
AN ADHERENT WAX COATING
Filed June 1, 1955
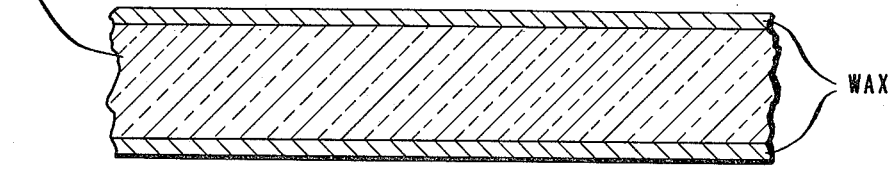
INVENTORS
HERBERT NAGEL
LAWRENCE ROY HATT
BY
ATTORNEY

United States Patent Office 2,944,918
Patented July 12, 1960

2,944,918

POLYETHYLENE TEREPHTHALATE FILM HAVING AN ADHERENT WAX COATING

Herbert Nagel and Lawrence Roy Hatt, Wilmington, Del., assignors to E. I. du Pont de Nemours and Company, Wilmington, Del., a corporation of Delaware Filed June 1, 1955, Ser. No. 512,588

9 Claims. (Cl. 117—68.5)

This invention relates to polyethylene terephthalate film, and more particularly, to oriented polyethylene terephthalate film having an adherent moistureproof coating.

The desired properties for transparent packaging films are well known. They include strength, heat-sealability, film durability as well as durability of the heat-seal, moistureproofness, low permeability to oxygen and carbon dioxide, high gloss, clarity, and freedom from electrostatic charges.

In the case of polyethylene terephthalate film, the required strength is obtained by orienting the film by means of a stretching and/or rolling operation with or without heat-setting the film depending on whether a heat-stable or a heat-shrinkable film is desired. Orienting polyethylene terephthalate film also decreases the permeability of the film to moisture vapor, i.e., enhances its moistureproofness. However, after orienting polyethylene film it is no longer possible to heat-seal the film with conventional heat-sealing apparatus and obtain durable bonds. Attempts to heat seal the film in the usual way results in severe shrinkage with resultant puckering and weaknesses at the seal. Moreover, it has been found that when the oriented film is used in relatively thin gauges (as low as 0.25 mil), permissible because of its increased strength, the moisture vapor permeability of the film, even though enhanced by orientation, is still not low enough for those packaging applications where moistureproofing is of utmost importance.

An object of the present invention, therefore, is to provide oriented polyethylene terephthalate film, particularly thin film, which is readily heat-sealable. A further object is to provide a thin polyethylene terephthalate film having a reduced premeability to water vapor. Other objects will be apparent from the following description of this invention.

The above objects are accomplished by providing an oriented polyethylene terephthalate film having a continuous, thin, uniform wax coating, said coating being no thicker than about 0.015 gram per square inch for film coated on two sides.

This invention resides in the discovery that a continuous wax coating applied to the surface of an oriented polyethylene terephthalate film adheres strongly to the film surface when it is applied as a thin coating not in excess of 0.015 grams/square inch for film coated on two sides. The wax coated film may be flexed and abused at room temperature and the coating does not appear to be affected. This high degree of adhesion between wax and oriented polyethylene terephthalate film is quite surprising in that oriented polyethylene terephthalate is notable for its lack of ready adherence to other materials. Furthermore, it is also surprising that upon applying a wax coating to a heat-shrinkable polyethylene terephthalate film, i.e., one which has been stretched and/or rolled in one or two directions but not heat-set, the wax coating still remains strongly adherent to the base film after it has been shrunk back to its original dimensions upon being immersed into boiling water at 100° C. for about 5 seconds.

The accompanying diagrammatic drawing of a cross-section, greatly enlarged, of a transparent film of polyethylene terephthalate coated on both sides with a thin coating of wax, is illustrative of a typical product of this invention.

While the present wax coatings will be described hereinafter as being applied to polyethylene terephthalate film it should be understood that these wax coatings may be readily applied to films from polyethylene terephthalates which have been modified with small amounts of acids or esters thereof, from the group consisting of isophthalic acid, bibenzoic acid, sebacic acid, adipic acid, and hexahydro-terephthalic acid. The production of polyethylene terephthalate is fully described in U.S. Patent 2,465,319 to Whinfield and Dickson. From a commercial standpoint, the most attractive process for the production of polyethylene terephthalate comprises carrying out an ester interchange between ethylene glycol and dimethyl terephthalate to form bis-2-hydroxy-ethyl terephthalate which is polymerized to polyethylene terephthalate under reduced pressure and at elevated temperatures. In such a reaction, various modified polyethylene terephthalate may be formed by reacting ethylene glycol, dimethyl terephthalate and a small quantity, e.g., 10–15%, of a low alkyl ester of one of the acids mentioned above.

The polyethylene terephthalate film may be oriented by stretching and/or rolling the film in one or two directions. If a heat-shrinkable film is not desired, the film after orientation is heat-set under tension, i.e., without permitting dimensional change, at elevated temperatures, such as within the range from 150°–250°.

The wax coating is preferably a high melting microcrystalline paraffin wax (e.g., having a melting point within the range from 60°–85° C.) which provides for a greater resistance to water vapor transmission than the low melting paraffins. Since a substantially transparent film is desired, paraffin waxes are preferred because they are colorless and odorless. Other types of waxes may be employed in admixture with the paraffin waxes in order to lend other desirable properties to the coating. For example, other types of waxes may be added to the paraffin wax to decrease the melting point of the wax coating, or impart other physical characteristics to the wax coating peculiar to the modifying wax added. Other types of waxes which may be employed include Japan wax, bees wax, ceresin wax, carnauba wax, Chinese wax, synthetic waxes derived from solid poly ethylene glycols, chlorinated paraffin waxes, etc.

The wax coating is applied in the form of a relatively thin, uniform, continuous coating which is no thicker than about 0.015 gram/square inch, and preferably about 0.005 gram/square inch (about 8 grams/square meter) for film coated on two sides. The degree of adhesion between the wax coatings and the base film decreases as the coating weight per unit area increases. Coatings thicker than about 0.015 gram/square inch cannot withstand the flexing and abuse suffered by packaging materials during consumer handling. On the other hand, only a relatively uniform thin wax coating is necessary to obtain the degree of moisture vapor impermeability required for a useful packaging film.

The following specific examples will serve to further illustrate the practice and principles of this invention. Parts and percentages are by weight unless otherwise indicated.

EXAMPLE I

A base film of polyethylene terephthalate (1 mil in thickness), stretched three times its original dimensions in two directions (non-heat set) was coated by dipping it into the following solution:

| | Parts |
|---|---|
| Refined paraffin wax ("Sunoco" Wax No. 5512 having a melting point of about 78° C.) | 20 |
| Toluene | 180 |

The above solution was placed in a coating trough having a glass rod immersed in the solution and mounted across the trough and separated from the bottom of the trough. The film was conducted into the coating trough and under the glass rod, and thereafter, the film was passed between two off-set doctor rolls in the form of glass rods which served to remove excess coating from the film surface. The coating solution was originally mixed together and maintained at about 80° C. for 30 minutes. During the coating operation the coating solution was maintained at a temperature between 65°–70° C. The coated film was then dried in air at room temperature. When the coating appeared to be superficially dry, the coated film was dried in a hot air oven at 65° C.–75° C. for about 5 minutes.

The adhesion between the base film and the wax coating was found to be excellent both before and after film shrinkage. The film could be flexed at room temperature without flaking of the coating. The coated films may be heat-sealed together at a temperature above the melting point of the wax.

In the following table (Table I) the properties of the resulting film are compared to those of uncoated film.

*Table I*

| Film | Permeability Before Shrinkage (gms./100 m.²/hr.) | Permeability After Shrinkage [1] (gms./100 m.²/hr.) | Original Dimensions | | Dimensions After Shrinkage | |
|---|---|---|---|---|---|---|
| | | | MD (cm.) | TD (cm.) | MD (cm.) | TD (cm.) |
| Uncoated | 151 | 66 | 10.0 | 5.0 | 7.1 | 2.5 |
| Coated | 11 | 24 | 10.0 | 5.0 | 7.8 | 3.5 |

[1] Shrinkage effected at 100° C. in water for 5 seconds.

The details of the methods of testing the film follow.

Moisture permeability is determined by placing the test film over the top of an aluminum cup containing 15 milliliters of water, the test area being 33.3 square centimeters. The assembly is weighed accurately and then placed in a dry (less than 3% relative humidity) air swept oven at 39.5° C. for 24 hours. The assembly is removed from the oven, cooled at room temperature and reweighed. The weight loss is converted to grams of water lost/100 square meters/hour.

Shrinkage patterns are determined by immersing strips of films completely in the water at 100° C. for 5 seconds. For measuring the degree of shrinkage in the machine direction a strip of film 1" x 6" was used, the length of this film running in the machine direction. A distance of 10 centimeters (cm.) was marked along the length of the film and two open mouth clips were clamped across the width of the film at extremities of the 10-centimeter length. This film was then immersed in boiling water (100° C.) and the amount of shrinkage is about 25%. For testing the TD shrinkage a film strip 1" x 4" was used, the length of the film running in the TD. A distance of 5 centimeters was marked along the TD direction and this film was also clamped at the extremities of this 5-centimeter length. After immersion in boiling water for 5 seconds the shrinkage was noted. On the average for biaxially stretched (3X) film the TD shrinkage (TD being the last direction of stretch) was about 50%.

The following examples will further serve to illustrate the present invention.

EXAMPLE 2

In a manner described in Example 1, a base film of polyethylene terephthalate (stretched 3X in both directions without heat-setting) was coated with the following solution:

| | Parts |
|---|---|
| Refined paraffin wax ("Sunoco" Wax No. 5512) | 60 |
| Copolymer of butadiene and styrene containing about 70% styrene ("Pliolite" S–7 manufactured by Goodyear Tire & Rubber Company) | 4 |
| Toluene | 180 |

EXAMPLE 3

A polyethylene terephthalate base as specified in Example 2 was coated in a manner similar to that of Example 1 with the following solution:

| | Parts |
|---|---|
| Refined paraffin wax ("Sunoco" Wax No. 5512) | 20 |
| Solid wax derived from a polyethylene glycol having a melting point within the range from 50°–55° C. ("Carbowax" 4000 manufactured by the Carbide & Carbon Chemicals Co.) | 10 |
| Toluene | 180 |

EXAMPLE 4

Example 2 was repeated except that the following coating solution was employed:

| | Parts |
|---|---|
| "Sunoco" Wax No. 5512 | 40 |
| Toluene | 160 |

EXAMPLE 5

The procedure of Example 2 was repeated except that the following coating solution was employed:

| | Parts |
|---|---|
| "Sunoco" Wax No. 5512 | 40 |
| "Carbowax" 4000 | 20 |
| Toluene | 160 |

EXAMPLE 6

The procedure of Example 2 was repeated except that the following coating solution was employed:

| | Parts |
|---|---|
| "Sunoco" Wax No. 5512 | 60 |
| Toluene | 140 |

EXAMPLE 7

Example 2 was repeated except that the following coating solution was employed:

| | Parts |
|---|---|
| "Sunoco" Wax No. 5512 | 60 |
| Chlorinated paraffin wax having a melting point within the range from 90°–100° C. ("Chlorowax" 70 manufactured by Diamond Alkali Company) | 20 |
| Toluene | 140 |

EXAMPLE 8

A base polyethylene terephthalate film stretched 3X in both directions and heat-set under tension at a temperature of about 200° C. was coated in a manner similar to that described hereinbefore with the following solution:

| | Parts |
|---|---|
| "Sunoco" Wax No. 5512 | 20 |
| Toluene | 180 |

In the following table the coating thickness or weight of wax on the base film expressed in grams per square inch was measured by extracting the wax coating from a unit area of coated film in a small container with toluene. After the toluene vaporized, the weight of residual wax in the container was determined by weight difference.

Table II compares the properties of the coated films with those of each other and with those of uncoated film.

Table II

| Example | Permeability Before Shrinkage (gms./100 m.²/hr.) | Permeability After Shrinkage¹ (gms./100 m.²/hr.) | Original Dimensions | | Dimensions After Shrinkage | | Coating Weight (gms./sq.in.) | Degree of Adhesion² | |
|---|---|---|---|---|---|---|---|---|---|
| | | | MD (cm.) | TD (cm.) | MD (cm.) | TD (cm.) | | Before Shrinkage | After Shrinkage |
| Control (Uncoated) | 151 | 66 | 10.0 | 5.0 | 7.1 | 2.5 | | | |
| 2 | 4 | 27 | 10.0 | 5.0 | 8.6 | 4.2 | | excellent | excellent. |
| 3 | 21 | 20 | 10.0 | 5.0 | 8.7 | 3.7 | 0.004 | do | Do. |
| 4 | 39 | 15 | 10.0 | 5.0 | 7.8 | 3.0 | 0.001 | do | Do. |
| 5 | 40 | 24 | 10.0 | 5.0 | 8.2 | 3.1 | 0.002 | do | Do. |
| 6 | 10 | 14 | 10.0 | 5.0 | 8.5 | 3.5 | 0.002 | do | Do. |
| 7 | 13 | 16 | 10.0 | 5.0 | 8.3 | 3.1 | 0.015 | fair | fair. |

¹ Shrinkage effected at 100° C. in water for 5 seconds.
² After flexing at room temperature.

Whereas the foregoing examples illustrate the application of wax coatings onto the bare film from solvent solutions, it should be understood that the coatings may be applied to the same effect from a hot melt of the wax.

While the invention contemplates the use of substantially colorless wax coatings, it is within the scope of the present invention to employ wax coatings which have been colored by employing pigments or dyes.

It should be emphasized that the application of a wax coating to a heat-shrinkable polyethylene terephthalate film followed by shrinking the film in air or a liquid maintained at a temperature in excess of 70° C. is a severe test of the surprising degree of adhesion between the wax coating and the base film. Hence, wax-coated heat-shrinkable polyethylene terephthalate films of the present invention are highly useful in a variety of wrapping and packaging applications. These heat-shrinkable films, as well as the heat-set films, find their greatest outlets in the field of food packaging. In general, the wax-coated heat-shrinkable films may be employed in multiple packaging of various items, for example, for wrapping individual servings of loose items such as crackers, nuts, cereals, etc. Furthermore, these heat-shrinkable sheets or films in tubular form may be employed in various bundling applications, for example, as a means of holding together a multiplicity of packages of cigarettes, small boxes of cereals, crackers and various food items which are packaged similarly.

We claim:
1. An oriented polyethylene terephthalate film having a continuous, thin, heat-sealable, uniform coating consisting essentially of wax, said coating being no thicker than about 0.015 gram/square inch for film coated on two sides.

2. Polyethylene terephthalate film according to claim 1 wherein the wax is paraffin wax.

3. Polyethylene terephthalate film according to claim 1 wherein the wax is microcrystalline paraffin wax having a melting point within the range of from 60°–85° C.

4. Polyethylene terephthalate film according to claim 1 wherein the coating is no thicker than about 0.005 gram/square inch for film coated on two sides.

5. Polyethylene terephthalate film according to claim 4 wherein the wax is paraffin wax.

6. A heat-shrinkable polyethylene terephthalate film having a continuous, thin, heat-sealable, uniform coating consisting essentially of wax, said coating being no thicker than about 0.015 gram/square inch for film coated on two sides.

7. Heat-shrinkable polyethylene terephthalate film according to claim 6 wherein the wax is paraffin wax.

8. Heat-shrinkable polyethylene terephthalate film according to claim 6 wherein the wax is microcrystalline paraffin wax having a melting point within the range of from 60°–85° C.

9. Heat-shrinkable polyethylene terephthalate film according to claim 6 wherein the coating is no thicker than about 0.005 gram/square inch for film coated on two sides.

References Cited in the file of this patent

UNITED STATES PATENTS

| | | |
|---|---|---|
| 2,147,180 | Ubben | Feb. 14, 1939 |
| 2,282,375 | Padgett | May 12, 1942 |
| 2,292,518 | Helfrich | Aug. 11, 1942 |
| 2,348,688 | Abrams et al. | May 9, 1944 |
| 2,465,319 | Whinfield et al. | Mar. 22, 1949 |
| 2,561,147 | Smith | July 17, 1951 |
| 2,606,120 | Cherepow et al. | Aug. 5, 1952 |
| 2,678,285 | Browning | May 11, 1954 |
| 2,759,851 | Fluck | Aug. 21, 1956 |
| 2,762,720 | Michel | Sept. 11, 1956 |